(12) United States Patent
Zhang et al.

(10) Patent No.: US 10,713,064 B2
(45) Date of Patent: Jul. 14, 2020

(54) USER INTERFACE CONFIGURATION USING ACTIVATOR FIELDS

(71) Applicant: SAP SE, Walldorf (DE)

(72) Inventors: Wenli Zhang, San Jose, CA (US); Anil Samudrala, Newark, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/351,318

(22) Filed: Mar. 12, 2019

(65) Prior Publication Data

US 2019/0213018 A1    Jul. 11, 2019

Related U.S. Application Data

(63) Continuation of application No. 15/801,682, filed on Nov. 2, 2017, now Pat. No. 10,275,264.

(51) Int. Cl.
| | |
|---|---|
| *G06F 3/048* | (2013.01) |
| *G06F 9/445* | (2018.01) |
| *H04L 12/911* | (2013.01) |
| *G06F 8/38* | (2018.01) |

(52) U.S. Cl.
CPC .......... *G06F 9/44505* (2013.01); *G06F 8/38* (2013.01); *H04L 47/70* (2013.01)

(58) Field of Classification Search
CPC ......... G06F 9/44505; G06F 8/38; H04L 47/70
USPC ...................................................... 715/780
See application file for complete search history.

(56) References Cited

U.S. PATENT DOCUMENTS

| | | | |
|---|---|---|---|
| 8,432,332 B2 | 4/2013 | Tsai et al. | |
| 8,549,595 B1 | 10/2013 | Vaisman et al. | |
| 9,300,651 B2 | 3/2016 | Cai et al. | |
| 9,848,000 B2 | 12/2017 | Yu et al. | |
| 9,910,663 B1 | 3/2018 | Biear | |
| 10,275,264 B1 * | 4/2019 | Zhang | ........................ G06F 8/38 |
| 2014/0136593 A1 * | 5/2014 | Samudrala | .............. H04L 67/10 |
| | | | 709/202 |
| 2015/0160810 A1 * | 6/2015 | Zhang | ..................... G06F 9/451 |
| | | | 715/744 |
| 2016/0212248 A1 | 7/2016 | Samudrala et al. | |
| 2017/0131974 A1 * | 5/2017 | Balasubramanian | ..... G06F 8/30 |
| 2018/0157686 A1 * | 6/2018 | Zhang | ................... G06F 16/252 |
| 2018/0322157 A1 * | 11/2018 | Lee | ......................... G06F 16/27 |
| 2019/0164122 A1 * | 5/2019 | Zhang | .................. B64C 39/024 |

OTHER PUBLICATIONS

U.S. Appl. No. 15/801,682, filed Nov. 2, 2017 by Wenli Zhang et al. (Unpublished.)

* cited by examiner

*Primary Examiner* — David Phantana-angkool
(74) *Attorney, Agent, or Firm* — Fountainhead Law Group P.C.

(57) ABSTRACT

A method displays a user interface including an activation entry for the activation entry and receives a first value that is input for the activation entry. In response to receiving the first value, the method determines an activator entry that is linked to the activation entry via linking information. The activator entry includes an activator value. The first value is compared to the activator value to calculate a visibility status for the activator entry. The user interface is altered based on the visibility status of the activator entry.

20 Claims, 9 Drawing Sheets

```
                                    110
                                     ↓

202-1
<ConnectionProperties displayName= "ConnectionInfo" id= "1" name= "ConnectionInfo">
        ⎛<PropertyEntry defaultValue= "local" description= "Choose the File Source"
        ⎜ displayName = "Source Options" id= "2" name = source_options      212
204-1 ⎨        <EnumValue displayName= "SharePoint Server" name= "SharePoint"/> ⎫
        ⎜        <EnumValue displayName= "Local File System" name= "local"/>    ⎬ 207
        ⎝</PropertyEntry>                                                        ⎭
        ⎛<PropertyEntry defaultValue= "local" description= "Choose the File Target"
        ⎜ displayName = "Target Options" id= "3" name = target_options
204-2 ⎨        <EnumValue displayName= "Remote HDFS" name= "HDFS"/>
        ⎜        <EnumValue displayName= "Local File System" name= "local"/>
        ⎝</PropertyEntry>
204-3  <PropertyEntry defaultValue= "C:rootdir" displayName = "Root Directory" id= "4"
name = rootdir
204-4  </PropertyEntry>
        <PropertyEntry defaultValue= "C:rootdir" displayName = "Directory of the file format
definitions" id= "2" name = fileformatdir
        </PropertyEntry>
202-2  <PropertyGroup displayName= "HDFS Configuration" id= "6" name= "HDFS">
202-3  <PropertyGroup displayName= "SharePoint Configuration" id= "11" name=
        "SharePoint">
        ⎛        <PropertyEntry description= "SharePoint Server URL"     displayName =
        ⎜ "Server URL" id= "12" name = spurl — 208
204-5 ⎨                <Activator id= "2" name= "source_options"/>
        ⎜                        <Value>SharePoint</Value>
        ⎜                </Activator>
        ⎝        </PropertyEntry>
        ⎛        <PropertyEntry description= "Set a Directory Nmae for Downloaded SharePoint
        ⎜ Files"  displayName = "Local Folder Path" id= "13" name = spdir
        ⎜                <Activator id= "2" name= "source_options"/>
204-6 ⎨        210 —  <Value>SharePoint</Value>
        ⎜                </Activator>
        ⎝        </PropertyEntry>                       206
        </PropertyGroup>
</ConnectionProperties>
```

| Property Name | Value |
|---|---|
| ⊟ConnectionInfo | 220 |
|     Source Options | Local File Server |
|     Target Options | Remote HDFS |
|     Root Directory | rootdir |
|     Directory of the file format definitions | rootdir |
| ⊞ HDFS Configuration | |
| ⊞ Local File Server Configuration | |
|   202-4 | |

```
<ConnectionProperties name="ConnectionInfo">
    <PropertyEntry description="Choose the File Source" name="source_options">SharePoint</PropertyEntry>
    <PropertyEntry description="Choose the File Target" name="target_options">Remote HDFS</PropertyEntry>
    <PropertyEntry description="Root Directory" name="root">rootdir</PropertyEntry>
    <PropertyEntry description="fileformatdir" name="root">rootdir</PropertyEntry>
    <PropertyGroup displayName="HDFS Configuration" id="6" name="HDFS">
    <PropertyGroup displayName="SharePoint Configuration" id="11" name="SharePoint">
        <PropertyEntry description="SharePoint Server URL" name=spurl>server.company.xxx</PropertyEntry>
        <PropertyEntry description="Set a Directory Name for Downloaded SharePoint Files" displayName="Local Folder Path" name=spdir>c:/temp</PropertyEntry>
    </PropertyGroup>
</ConnectionProperties>
```

USER INTERFACE CONFIGURATION USING ACTIVATOR FIELDS

CROSS REFERENCES TO RELATED APPLICATIONS

This application is a continuation of U.S. patent application Ser. No. 15/801,682, filed Nov. 2, 2017. The entire contents of U.S. patent application Ser. No. 15/801,682 is incorporated herein by reference in its entirety for all purposes.

BACKGROUND

A system may connect multiple sources, such as different databases, applications, etc. For example, a local source may connect to a remote source, multiple remote sources may connect, or any source that is remote from another source can connect. Also, there may be multiple instances of each remote source, such as different databases and different applications. To transfer data between sources, the system needs to configure each source to connect to one another. To create the connection, a developer may use a user interface to configure the values for the connection between the sources. The user interface may be statically configured to display different options for configuring the sources. However, not all configurations may require all of the options that are displayed. Because the user interface is static, the display of the different options stays the same no matter what configuration the developer inputs. This may clutter the user interface and confuse the developer. Further, the developer may end up inputting information for options that are not required for the configuration. For example, the user interface may display options for multiple sources. However, if a user selects a first source, then inputting options for another source may not be necessary even though the user interface is still displaying those options.

BRIEF DESCRIPTION OF THE DRAWINGS

FIG. 2A depicts an example of a resource adapter configuration according to some embodiments.

FIG. 2C depicts an example of the user interface when local file server is selected by a user according to some embodiments.

FIG. 2D depicts an example of a remote source configuration according to some embodiments.

DETAILED DESCRIPTION

Figure 1:
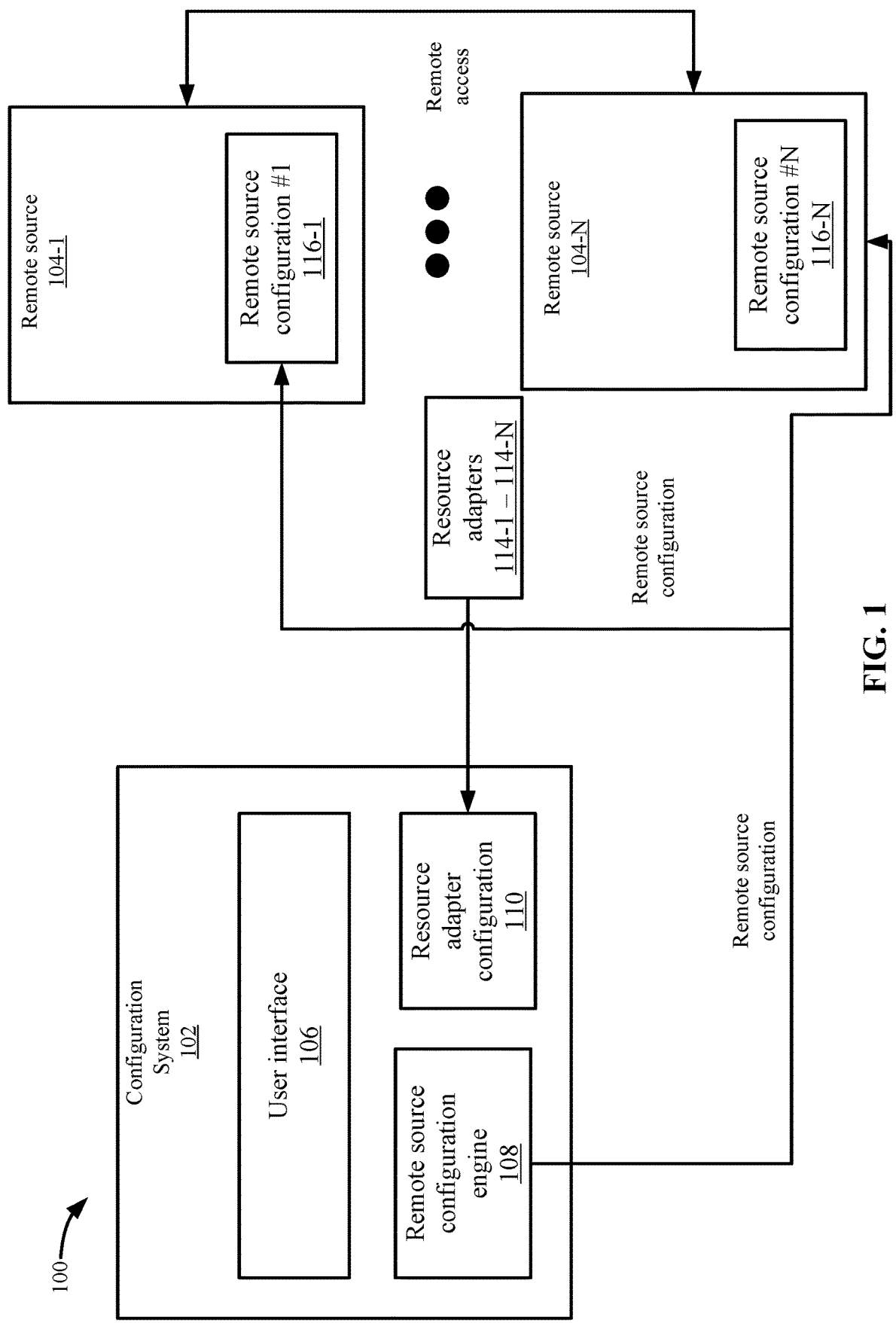
FIG. 1 depicts a simplified system of a method for configuring connections to remote sources using resource adapter configurations according to some embodiments.

Described herein are techniques for a remote source configuration system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Some embodiments provide a system to allow users to configure access to remote sources. A remote source is when a source accesses a target source. The target source may be remotely located from the source, which means data at the target source is not stored at the source. The source may be local to a company and be access data at the remote target source. Remote sources will be referred to in the description as accessing each other, but one of the remote sources may be local to a company, but accessing a remote source. These two sources are referred to as remote sources since they are remote to each other. The remote sources may store remote source configurations that are used to configure the remote sources to connect to one another. When a user wants to generate a remote source configuration, the system can retrieve a resource adapter for a type of remote source. The resource adapters may be stored in a system resource adapter table and can be used to configure any number of remote sources. The resource adapters are used to generate resource adapter configurations that are in a hierarchical format that a user interface uses to display configurable entries for the remote source configuration. The resource adapter configuration may describe entries (e.g., groups and fields) that can be displayed or not displayed on the user interface. If an entry's visibility depends on other entry's value, then the other entries are configured as activation entries. The activation entries are entries that have multiple values associated with them, for which a user can change the value during runtime. Activator entries that include activators that the system uses to determine whether to change the visibility of the activator entries according to the values associated with the activation entries. This structure also allows the system to configure multiple entries or cross group support. That is, an activator entry may depend on the values for multiple activation entries.

A user may input information for the configuration of the remote source. When the input is received for different entries, the system can determine which activator entries to display in the user interface based on the values associated with the activation entries. For example, when a first value is set for an activation entry, the system may analyze the activator entries and determine which activator entries to display and not display. This generates a dynamic user interface displays only information that is relevant to the current remote source configuration being input by a user.

FIG. 1 depicts a simplified system 100 of a method for configuring connections to remote sources using resource adapter configurations according to some embodiments. System 100 includes a configuration system 102 and remote sources 104-1 to 104-N. Remote sources 104 may connect via resource adapters 114-1 and 114-2 upon configuration of the connection.

Configuration system 102 includes a user interface 106 and a remote source configuration engine 108. User interface 106 can display a description of a resource adapter configuration 110 and allow a user to input values for the configuration. Resource adapter configuration 110 may describe the entries that are included in resource adapters 114 and is in a format that user interface 106 uses to display the description. Some embodiments provide a dynamic user interface 106 that can be dynamically reconfigured. Conventionally as discussed in the Background, a static user interface is provided in which all entries may be displayed no matter what the user selects. By providing a dynamic reconfiguration of user interface 106, a user may better be able to review the resource adapter configuration for connections between remote sources. In user interface 106, entries that do have associated activator entries may always be displayed, and entries that are activator entries with activators are displayed according to the corresponding activation entry values. This provides a directed view of user interface 106 that guides the user as to which entries should be configured.

Remote source configuration engine 108 may receive resource adapters 114-1 to 114-N for configuring remote sources 104. Each different type of remote source 104 may include a different resource adapter 114. For example, a first type of remote source 104-1 includes a resource adapter 114-1 and a second type of remote source 104-N includes a resource adapter 114-N. However, each instance of a remote source may require a remote source configuration 116 to be generated from the corresponding resource adapter 114 to provide connectivity to a remote source. In one instance, remote source 104-1 may want to access remote source 104-N. Although remote source 104-1 is referred to as remote, remote source 104-1 may be an application server of an enterprise that is accessing a remote source 104-N that is remote from the enterprise. In other examples, system 100 may connect two remote sources to transfer data, replicate data, transform data, or perform other data integration. In one example, the remote source configuration allows remote source 104-1 to access data from remote source 104-N as if the data is stored on remote source 104-2.

Once receiving resource adapters 114, remote source configuration engine 108 parses resource adapters 114 and generates resource adapter configuration 110. Resource adapter configuration 110 defines which entries remote source configuration engine 108 generates in user interface 106. That is, remote source configuration engine 108 uses resource adapter configurations 110 to display entries for configuring values for a remote source configuration 116 for the remote source 104. A user can input values for the entries on user interface 106, which may then be inserted into remote source configuration 116. Resource adapter configuration 110 may specify which entries are displayed on user interface 106, and remote source configuration 116 includes the values that are input for the connection between remote sources 104.

Given that different types of remote sources may have different resource adapters 114, some embodiments use a format that allows user interface 106 to process different resource adapter configurations 110 for different resource adapters 114 in a common manner That is, user interface 106 does not need to know which resource adapter configuration 110 is being processed. Each resource adapter 114 is configured in a hierarchical format, such as an extensible markup language (XML) file format. The hierarchy may include entries that may be arranged in groups and fields. When the term entries is used, this may mean a group, field, multiple groups or fields, or a combination of group and fields. For example, a group may include multiple fields. Also, any of the groups or fields may be assigned values, such as a source may be assigned a first database location and a destination may be assigned a second database location. Remote source configuration engine 108 can receive resource adapters 114 and parse the hierarchical format in a standard way to generate resource adapter configurations 110.

Once user interface 106 displays entries for resource adapter configuration 110, a user can then input or change the values for some of the entries. When these values are changed, remote source configuration engine 108 can parse the resource adapter configuration 110 to evaluate the activation entries and activator entries. This may change the visibility of some entries in user interface 106. The use of activation entries and activator entries allows remote source configuration engine 108 to dynamically change user interface 106 based on a user's input. This produces a user interface that is transformed and clearer to a user when compared to a static user interface that may display unnecessary entries in which input could be received. The use of activation entries and activator entries allows user interface 106 to determine which entries to display and not display across multiple resource adapters. The activation entries and activator entries is a generic way to program the dynamic reconfiguration of user interface 106 in resource adapters. Remote source configuration engine 108 can determine the visibility of entries at runtime based on input from a user.

Once a configuration for a remote source connection is finalized in user interface 106, remote source configuration engine 108 uses the values to generate remote source configuration 116, which can be sent to remote sources 104. In some examples, remote source configuration engine 108 may test the connection for the remote source connection that was specified in remote source configuration 116. Remote source configuration engine 108 may test the values for the entries by using them to connect to a remote source 104. If successful, then remote source configuration engine 108 may send remote source configuration 116 to remote sources 104. If not successful, remote source configuration engine 108 may notify a user.

Resource Adapter Configuration 110 and User Interface 106

Figure 2B:
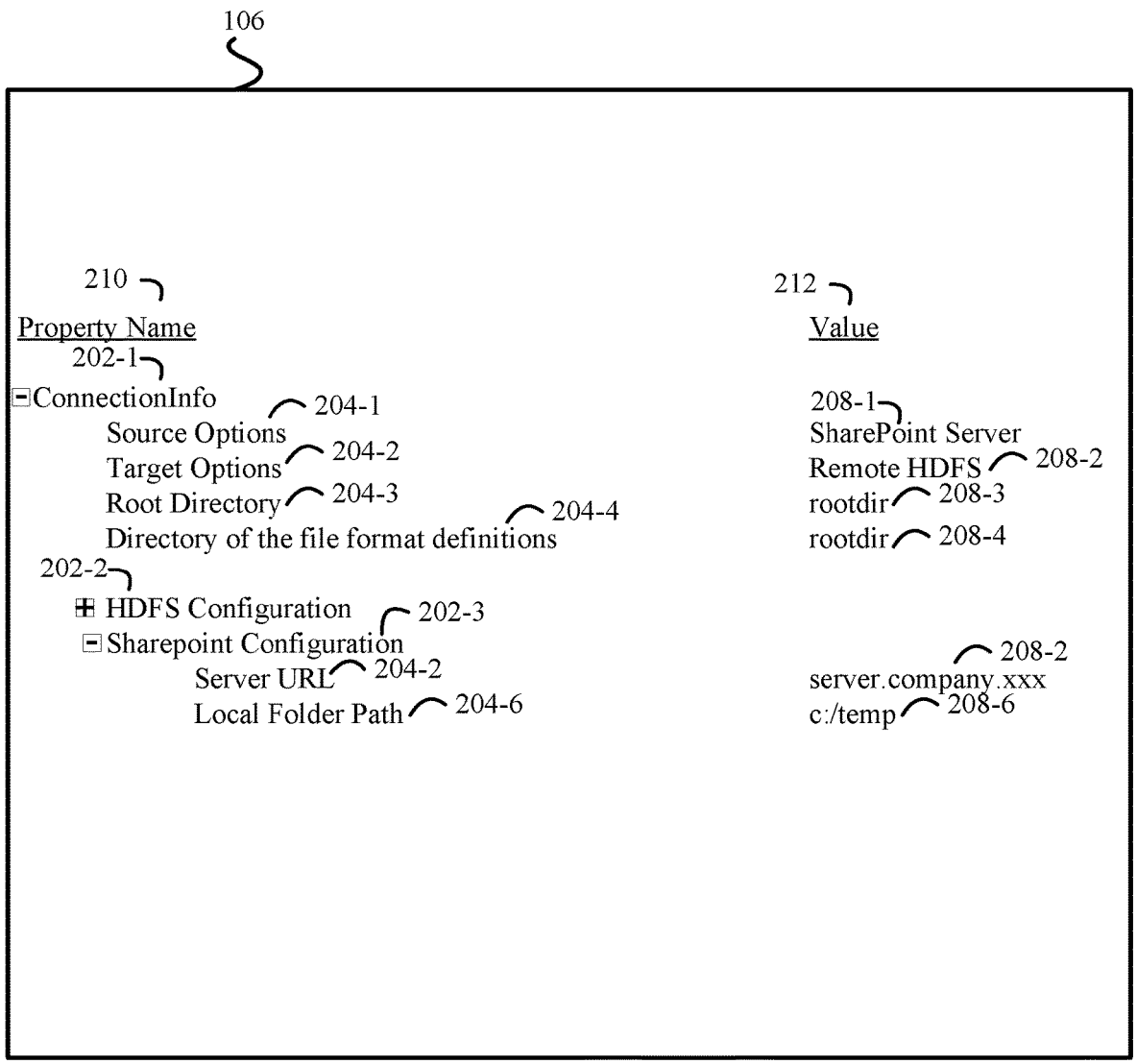
FIG. 2B depicts an example of a user interface according to some embodiments.

FIG. 2A depicts an example of a resource adapter configuration 110 and FIG. 2B depicts an example of user interface 106 according to some embodiments. Resource adapter configuration 110 may include entries of groups 202-1 to 202-3 and fields 204-1 to 204-6. In FIG. 2A, the configuration for three groups are shown as a first group 202-1 of ConnectionInfo, a second group 202-2 of HDFS configuration, and a third group 202-3 of SharePointConfiguration. In FIG. 2B, user interface 106 displays the names for these three groups at 202-1, 202-2, and 202-3 in a property name column 210 and values in a column 212.

Each group 202 may have fields 204. In resource adapter configuration 110, group 202-1 includes four fields 204-1 to 204-4 of Source Options, Target Options, Root Directory, and Directory of the file format definitions. The same reference numbers are used for groups and fields in user interface 106 as shown in resource adapter configuration 110. In user interface 106, these fields are shown below the ConnectionInfo group 202-1.

A user may input values for the entries. For example, at 208-1 to 208-4, the values for fields 204-1 to 204-4 can be input or alternatively can be automatically filled with default values. Some or all of these fields may be activation fields. Activation fields are fields that have multiple value choices that a user can select. A user can change the value during runtime by inputting a value in Value column 212. Then, the fields that have activators may have their visibilities changed in user interface 106 depending on the value that is input. For example, in resource adapter configuration 110, group 202-3 includes two activator fields 204-5 and 204-6 of Server URL and Local File Path, respectively. The activation field at 204-1 may be one of two values as shown at 207 of:

SharePoint or local. This may mean that the source may be a SharePoint server or a local file system. In user interface 106, at 208-1, the user has selected SharePoint Server for the value (e.g., SharePoint). This indicates the value is SharePoint for the activation field.

To determine if a field has activator fields, remote source configuration engine 108 may use linking information, such as activator identifiers (IDs), to link the activation fields and activator fields. At 208 and 210, the activator fields include an activator ID of "2". This corresponds to the activator ID in activation field 204-1 at 212 since the Source Options field includes the same ID="2" value. Although the IDs are used to determine activator fields for activation fields, other linking information may be used. Once determining the activation field has activator fields, then remote source configuration engine 108 determines the activator field's visibility based on the user's selection of the activation field value. For example, the activator fields may be activated as a visibility status, which may mean the fields are shown in user interface 106 and/or a user can input values for the fields.

For both activator fields 204-5 and 204-6, the activator value is "SharePoint". The activation value and activator values may be compared. If a criteria is met, then a visibility status is changed. For example, the criteria may be that the activation value and activator values match; however, other criteria may be used. The visibility status may be visible when the values match and not visible when the values do not match. Since the user has selected the value of "SharePoint", then user interface 106 displays the fields shown at 204-5 and 204-6. However, if the user had selected "Local File System", which has the value of "Local", then activator fields 204-5 and 204-6 in group 202-3 would not be displayed. For example, group 202-3 is the SharePoint configuration, which does not need to be shown if the Local File System being used. In some embodiments, user interface 106 may not display the entire group 202-3 for the SharePoint configuration or may just not display the activator fields 204-5 and 204-6. Also, instead of not displaying the activator fields, remote source configuration engine 108 may change the visibility, such as greying out activator fields 204-5 and 204-6, not allowing any entry of values in activator fields 204-5 and 204-6, or other visibility changes that can be performed to indicate a visibility status for the activator fields.

In some examples a user may change the value from "SharePoint" to "Local File System". FIG. 2C depicts an example of user interface 106 when local file server is selected by a user according to some embodiments. At 220, the value for Source Options is Local File Server. In some examples, user interface 106 does not display activator fields 204-5 and 204-6. For example, group 202-3 may not be displayed so that activator fields 204-5 and 204-6 are not shown. In other examples, user interface 106 may remove activator fields 204-5 and 204-6, grey them out, etc. However, a group local file server configuration at 202-4 may be displayed to configured the local file server if activation fields are included. In other examples, the local file server value may not have any activator fields and nothing is displayed for that field.

To determine the visibility status for activator fields 204-5 and 204-6, remote source configuration engine 108 determines that activation fields 208-1 includes activator fields. Then, referring to activator fields 204-5 and 204-6 in resource adapter configuration 110, remote source configuration engine 108 determines that the value of "local" for source options is not the same as the value of "SharePoint" for activator fields 204-5 and 204-6. Thus, remote source configuration engine 108 determines that activator fields 204-5 and 204-6 are not activated due to the value in activation field 208-1. Being not activated may mean that the fields are shown or input cannot be received for the fields.

Once a save command in user interface 106 is received and a user has created a remote source configuration, remote source configuration engine 108 uses the values to generate remote source configuration 116. FIG. 2D depicts an example of remote source configuration 116 according to some embodiments. Remote source configuration 116 includes the values entered by a user. For example, at 250, remote source configuration 116 stores the values for group 202-1 and fields 204-1 to 204-4. Then, at 252, since group 202-3 is activated in addition to activator fields 204-5 and 204-6, remote source configuration 116 stores the values for activator fields 204-5 and 204-6.

Remote source configuration engine 108 may store this remote source configuration 116. This may be in a hierarchical format, such as an extensible markup language (XML) file format, and remote source configuration engine 108 can send remote source configuration 116 to remote sources 104, such as the source and target of a SharePoint server and a remote HDFS. Remote source 104 may store the file in a table as connection information for connecting to another remote source 104. This connection information may be later retrieved by remote source configuration engine 108 if additional changes to resource adapter configuration 110 are needed.

Remote Source Configuration Engine 108

Figure 3:
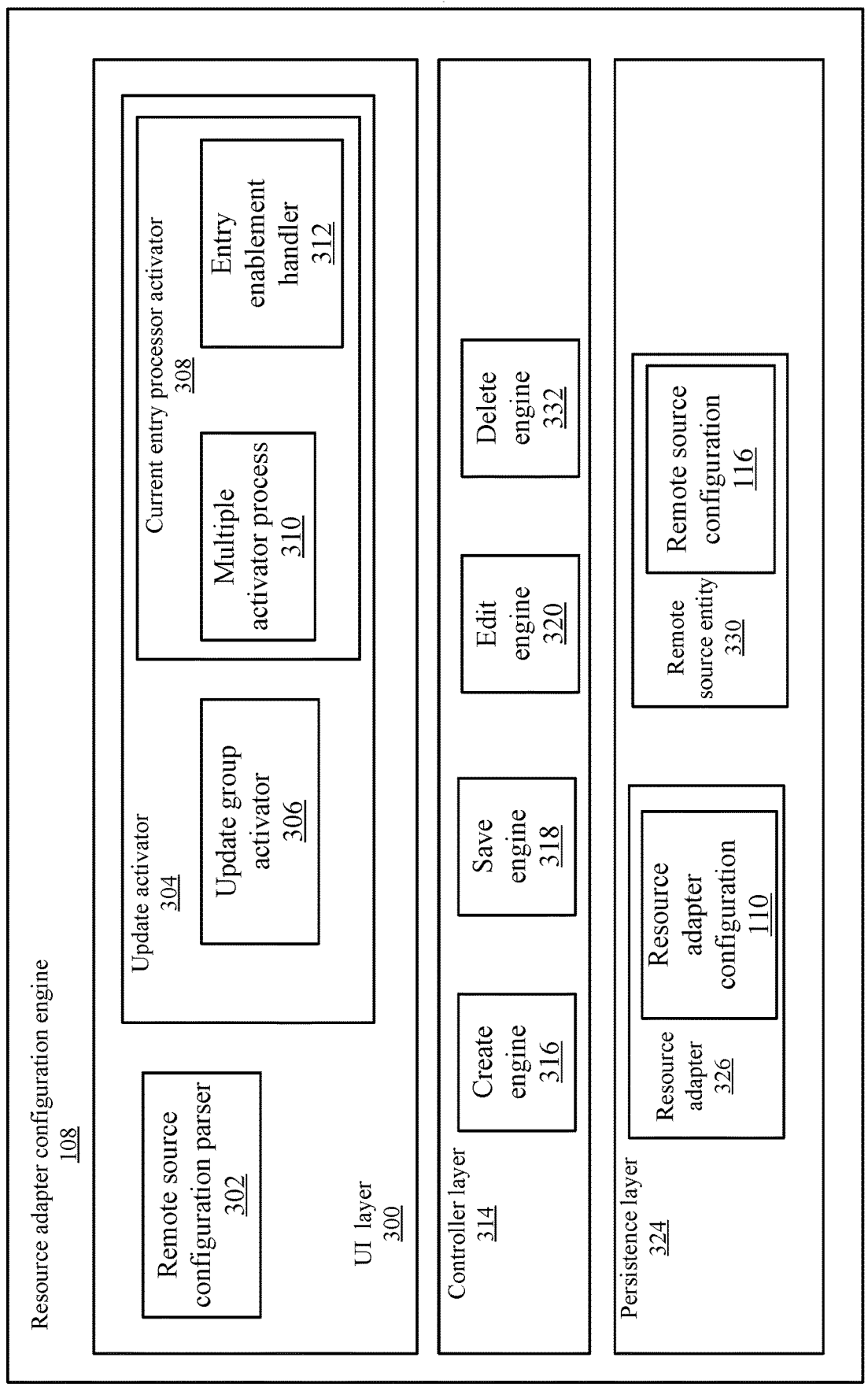
FIG. 3 depicts a more detailed example of a remote source configuration engine according to some embodiments.

FIG. 3 depicts a more detailed example of remote source configuration engine 108 according to some embodiments. Remote source configuration engine 108 includes a user interface (UI) layer 300, a controller layer 314, and a persistence layer 324. The layers may be included on a single computing device or distributed among multiple computing devices.

User interface layer 300 receives resource adapters 114 and transforms the adapters into resource adapter configuration 110, which is a user interface-usable format that user interface 106 can use. A remote source configuration parser 302 parses the resource adapter configuration 110 and displays groups and fields from the resource adapter configuration in user interface 106. In one example, when values have not been entered for any activation fields, then user interface 106 does not display any activator fields. Also, default values may be entered into activation fields, which may trigger display of activator fields depending on the default values.

When a change to an activation field is received from a user, such as a user may change an activation field to a new value or input a value when no value was previously entered, update activator 304 is triggered. Also, update activator 304 may be performed every time a value for an entry is changed. Update activator 304 recursively iterates through entries to determine any activators are activated by the change. Update activator 304 may use different processes to process groups and fields. For example, an update group activator 306 may recursively iterate through the groups in resource adapter configuration 110 to determine if the activator for an activation entry is used in any of the groups. Update group activator 306 may call current entry processor activator 308 to process each entry of a group. For example, each group may have multiple fields and a current entry processor activator 308 may review the group and fields in the group to determine if this activator is used in the group or any of the current fields of each respective group. If an activation group or field has an activator, current entry processor activator 308 checks each activator group or field's value to determine if its value is the same as the activator value to enable that activator entry. Current entry processor activator 308 then determines whether or not to display group or fields based on the values.

An activator entry may depend on multiple activation entries. For example, the value for multiple activation entries should correspond to a value for an activator entry for that activator entry to be activated. A multiple activator process 310 may process activator entries that depend on multiple activation entries. In one embodiment, multiple activator process 310 may use logic to determine whether to activate an activator entry. In some examples, the value for each activation entry needs to correspond to the value for the activator entry. If the result for multiple activation entries is "true" and "true", then this activator entry is activated. However, a result of "true" and "false" does not activate the activator entry. This may be similar to a logical AND operation. One reason the AND operation is used is because an activator entry may only be activated when it is used and a false result may mean that one activation entry is not configured to use the activator and thus the activator should not be visible.

When an activator entry should be activated, entry enablement handler 312 may activate the entry. Conversely, entry enablement handler 312 may deactivate the entry when a value change deactivates the activator entry. For example, entry enablement handler 312 may cause user interface 106 to change the status of an entry, such as by making the entry visible or not visible.

The user may perform different actions, such as adding a group or removing a group in the configuration, and within a group, adding or changing the value of an entry or of a field. This may cause entry enablement handler 312 to perform different actions. For example, if the group or fields have more than one activator entry, update group activator 306 and current entry processor activator 308 check each activator entry's value to determine if the activator entry's value is the same as the current activation value to determine if the group or field should be enabled. If the field is activated by the input, but is not activated in the existing user interface 106, entry enablement handler 312 adds the field back to user interface 106, such as in the hierarchy displayed in user interface 106. If the group is not displayed in user interface 106, entry enablement handler 312 adds the group back to user interface. Adding the group or field back to user interface 106 may also display places where users can now input values for the added groups or fields. If the group or field is deactivated from the input, entry enablement handler 312 removes the group or field from user interface 106. If the input removes all fields from a group thus meaning the group is empty, then entry enablement handler 312 may remove the group from user interface 106.

Controller layer 314 includes functions used to control resource adapter configuration 110 and remote source configuration 116. For example, controller layer 314 includes a create engine 316, a save engine 318, an edit engine 320, and a delete engine 322. When user interface 106 triggers creation of a remote source, create engine 316 can create a resource adapter configuration 110 and pass resource adapter configuration 110 to user interface 106 for display of the resource adapter configuration. When user interface 106 saves remote source configuration 116, the values from user interface 106 are passed to controller layer 314 and save engine 318 saves remote source configuration 116 in persistence layer 324. When an edit to remote source configuration 116 in user interface 106 is received, edit engine 320 retrieves remote source configuration 116 from persistence layer 324 and returns remote source configuration 116 to user interface layer 300, where user interface 106 renders the data from remote source configuration 116. When a remote source is deleted, delete engine 322 deletes a remote source configuration 116 from the remote source.

Persistence layer 324 may store resource adapter configurations 110 with each resource adapter 326. Resource adapter 326 may include other data that is needed to access remote sources 104. Also, each remote source 104 may include a remote source entity 330 that stores information related to the remote source. For example, remote source entity 330 stores the values for remote source configuration 116. When a new remote source is created, a new remote source entity 330 is created with a remote source configuration 116 that is received from controller layer 314. Remote source entities 330 can also be edited and deleted from persistence layer 324.

Process of Creating Remote Source Configurations 116

Figure 4:
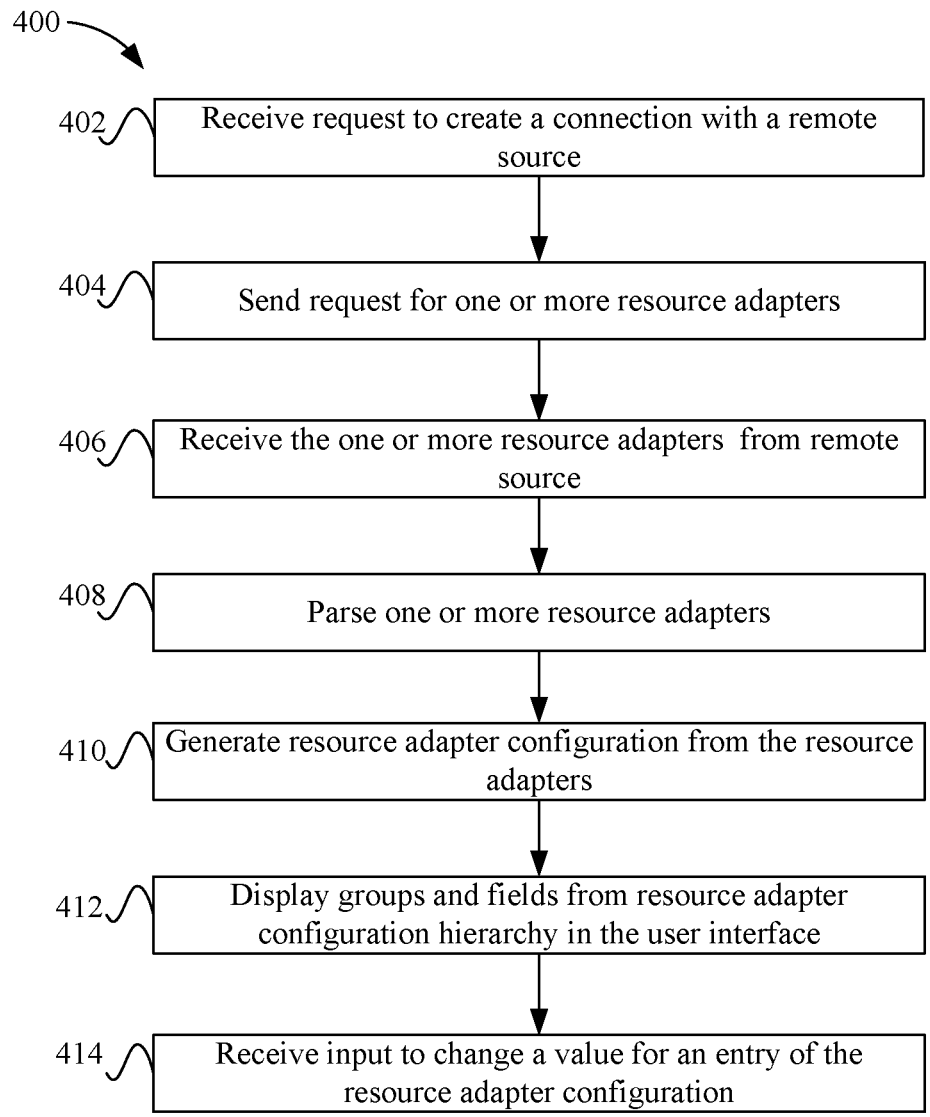
FIG. 4 depicts a simplified flowchart of a method for starting the process of creating a resource adapter configuration for a remote source according to some embodiments.

FIG. 4 depicts a simplified flowchart 400 of a method for starting the process of creating a resource adapter configuration 110 for a remote source 104 according to some embodiments. Remote source configuration engine 108 includes a specialized parser that recognizes activation entries and activator entries. The parser can determine linking information and determine a display status for activator entries. In one example, remote source configuration engine 108 parses all groups and fields when a change to a value is made. When using user interface 106, a user expects a certain response time to change user interface 106, and the specialized parser is used to perform the parsing in the time required to display the changed user interface. At 402, remote source configuration engine 108 receives a request to create a connection with a remote source. For example, a user may want to configure one remote source 104 to be able to connect to another remote source 104.

At 404, remote source configuration engine 108 sends a request for one or more resource adapters 114. The resource adapter 114 that is retrieved may be associated with a type of remote source 104 and is written in a hierarchical format. Remote source configuration engine 108 may require one or multiple resource adapters 114 for the types of remote sources that might connect. At 406, remote source configuration engine 108 receives the one or more resource adapters 114.

At 408, remote source configuration engine 108 parses the one or more resource adapters 114. For example, remote source configuration engine 108 may parse the groups and fields of resource adapter 114 and determine the activation/activator entries from the hierarchy of remote source configuration 116. Then, at 410, remote source configuration engine 108 generates resource adapter configuration 110 from the one or more resource adapters 114. Resource adapter configuration 110 includes information for possible entries that can be configured for remote source configuration 116. At 412, remote source configuration engine 108 displays groups and fields from resource adapter configuration 110 in user interface 106. For example, the groups and fields are displayed in a hierarchy. Also, remote source configuration engine 108 may not display activator groups or activator fields until input from a user is received for corresponding activation fields that specifies a value.

At 414, remote source configuration engine 108 receives an input to change a value for an entry of remote source configuration 116. For example, a user may change a value for one of the fields for a group. Once an entry is changed, then remote source configuration engine 108 may perform a process to determine activation of entries for user interface 106, if needed.

Figure 5:
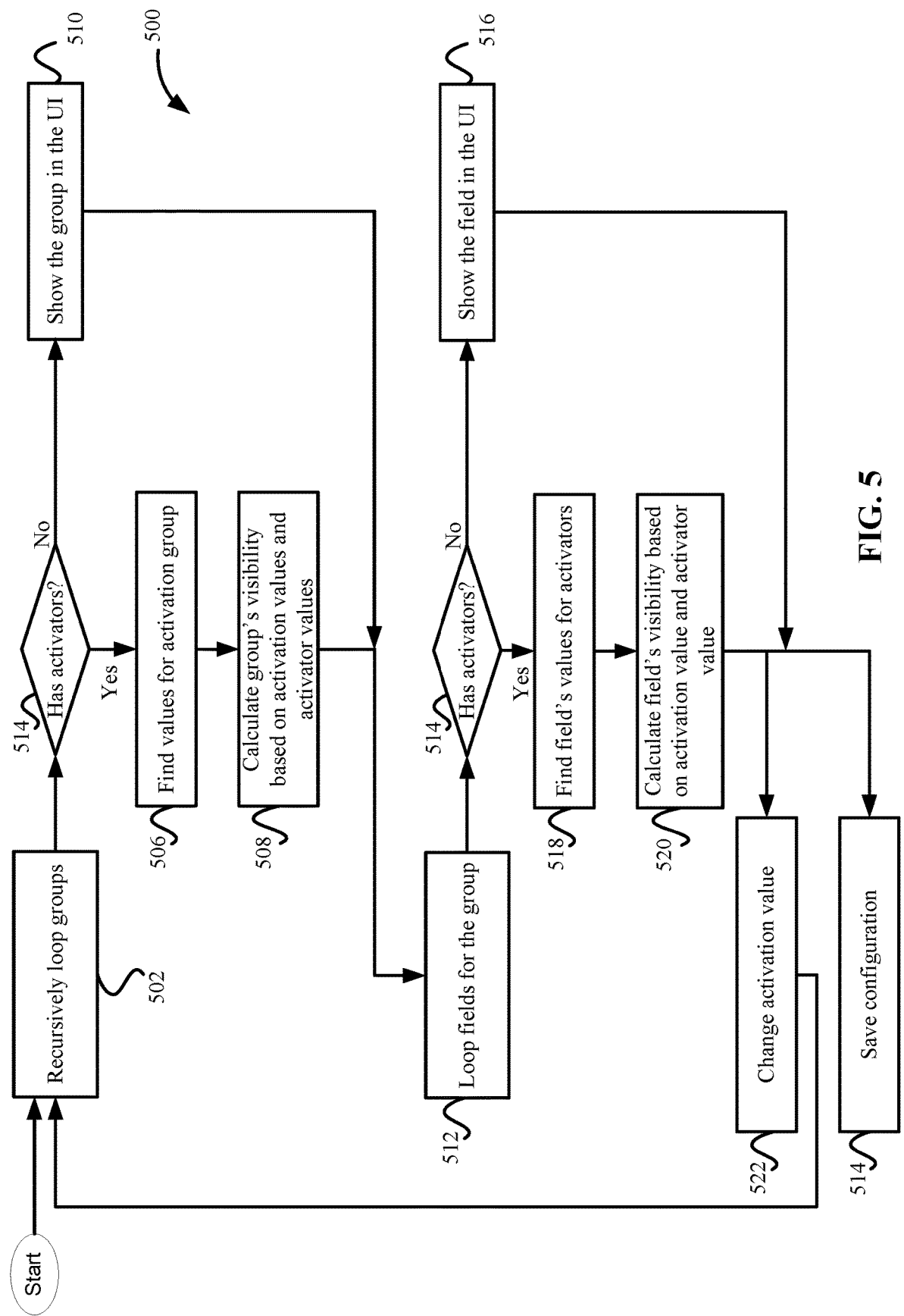
FIG. 5 depicts a simplified flowchart of a method for activating entries and generating the remote source configuration according to some embodiments.

Once an entry is changed, remote source configuration engine 108 then reviews resource adapter configuration 110 to determine whether to activate any entries. FIG. 5 depicts a simplified flowchart 500 of a method for activating entries and generating remote source configuration 116 according to some embodiments. At 502, once receiving the input to change a value for an entry in user interface 106, remote source configuration engine 108 recursively loops the groups of resource adapter configuration 110. For example, for each group, at 504, update group activator 206 determines if a group has activators entries that are associated with it. If not, at 510, remote source configuration engine 108 shows the group in user interface 106.

However, if the group has activator entries, at 506, update group activator 206 finds the activation entry's values for the activator entries. An activator for a group is a group that has an activator similar to the field's shown at 204-5 and 204-6 in FIG. 2A. The activation value is found from input from a user for the value for the activation group. Then, at 508, remote source configuration engine 108 calculates the activator group's visibility based on the activation values and activator values for the activator group. For example, remote source configuration engine 108 parses the activator group to determine the activator values and then compares the activator values to the activation values to determine if the group is activated or not. If a group is activated, user interface 106 may display the activator group with the activation group.

For each group, at 512, remote source configuration engine 108 loops the fields in each group. For example, remote source configuration engine 108 reviews each field in resource adapter configuration 110. At 514, current entry processor activator 208 determines if a field has activators associated with it. For example, a field may not include an activator and thus should be displayed in user interface 106. However, one or more of the fields may have associated activators, then remote source configuration engine 108 tests whether or not these activator fields should be activated or not. If the field does not have activators, at 516, remote source configuration engine 108 displays the field in user interface 106.

If the field has activators, at 518, remote source configuration engine 108 finds the values for the activation entry for the activator field. For example, in FIG. 2A, the activation values for field 204-1 may be SharePoint or local. However, the activation entry may be an activation group, activation field, multiple activation groups or fields, or any combination of the above. Then, at 520, remote source configuration engine 108 calculates the field's visibility based on the activation values and activator values. For example, in FIG. 2A, the activator value for fields 204-5 and 204-6 is Share-Point. Then, remote source configuration engine 108 compares the activator values to the activation values to determine if the field is activated or not. If a field is activated, user interface 106 may display the activator field with the activation field or group.

As the process proceeds, the user may again change a value in user interface 106. For example, at 522, user interface 106 receives a change to an activation value for an entry. Then, the process continues at 502 to continue looping the groups and fields of resource adapter configuration 110 to determine which entries to display in user interface 106.

When the process is finished, at 524, update activator 204 saves remote source configuration 116. For example, remote source configuration engine 108 saves the values from user interface 106 in remote source configuration 116.

Accordingly, some embodiments provide a flexible process to generate remote source configurations. By including activators in resource adapter configurations 110, remote source configuration engine 108 can dynamically generate user interface 106 according to a user's selection of values for certain fields or groups. The resource adapter configuration is also flexible and extendible. User interface 106 does not need to know which resource adapter is being used to be able to generate a remote source configuration. Multiple activation fields can be included in the configuration with multiple activators.

System

Figure 6:
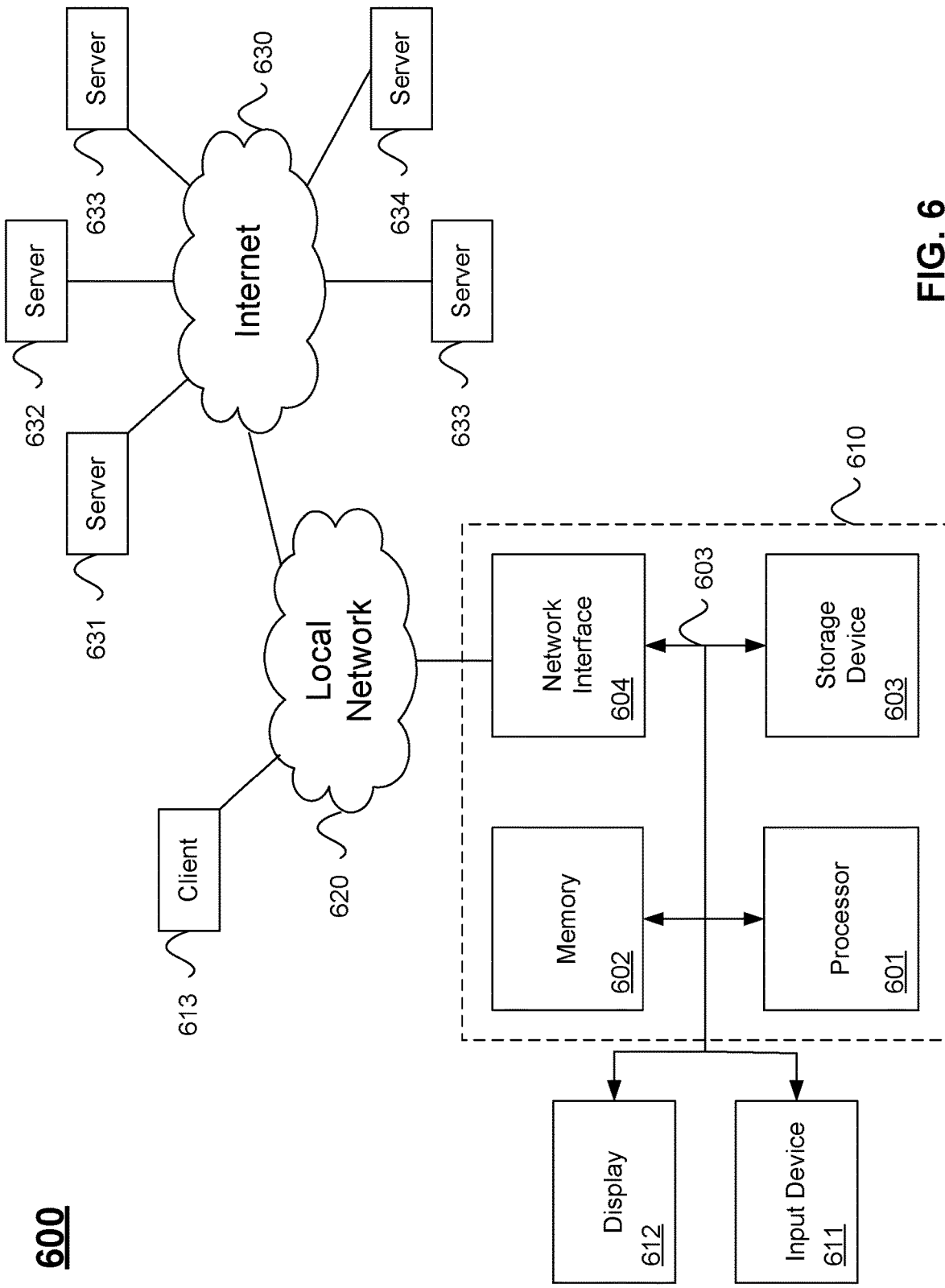
FIG. 6 illustrates hardware of a special purpose computing machine configured with the configuration system according to one embodiment.

FIG. 6 illustrates hardware of a special purpose computing machine configured with configuration system 102 according to one embodiment. An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   displaying, by a computing device, a user interface including an activation entry for the activation entry;
   receiving, by the computing device, a first value that is input for the activation entry;
   in response to receiving the first value, determining, by the computing device, an activator entry that is linked to the activation entry via linking information, the activator entry including an activator value;
   comparing, by the computing device, the first value to the activator value to calculate a visibility status for the activator entry; and
   altering, by the computing device, the user interface based on the visibility status of the activator entry.

2. The method of claim 1, wherein input for the activator entry is required for configuring a connection from a first source to a second source.

3. The method of claim 2, wherein altering the user interface based on the visibility status of the activator entry comprises:
   displaying the activator entry when it is required for configuring the connection from the first source to the second source based on the first value from the activation entry.

4. The method of claim 3, wherein altering the user interface based on the visibility status of the activator entry comprises:
   not displaying the activator entry when it is not required for configuring the connection from the first source to the second source based on the first value from the activation entry.

5. The method of claim 1, wherein:
   the activation entry is included in a group, and
   the activator entry is in the group for the activation entry.

6. The method of claim 5, wherein:
   the group includes a field, and
   the activator entry is a field linked to the activation entry.

7. The method of claim 1, further comprising:
   receiving a resource adapter for use in connecting a first source to a second source; and
   parsing the resource adapter to determine a resource adapter configuration in a hierarchical format that includes the activation entries and activator entries.

8. The method of claim 7, further comprising:
   reviewing each entry in the resource adapter configuration;
   determining whether each entry includes an activator entry; and
   displaying entries that do not include the activator entry in the user interface.

9. The method of claim 1, further comprising:
   selecting a group for the activation entry; and
   calculating a visibility of the group based on the first value and a group value.

10. The method of claim 9, further comprising:
    selecting a field for the group that is associated with the activator entry; and
    performing the comparing the first value to the activator value to calculate the visibility status for the field that is associated with the activator entry in the group.

11. The method of claim 10, wherein:
    the field that is associated with the activator entry is displayed when the first value meets a criteria with respect to the activator value for the activator entry.

12. The method of claim 1, further comprising:
    creating a remote source configuration for a connection from a first source to a second source based on the input for the activator entry.

13. The method of claim 12, wherein the user interface does not allow input for entries that are not activated by the first value such that the remote source configuration includes input only applicable for the connection.

14. The method of claim 1, wherein the linking information is an identifier for the activation entry and is included in the activator entry.

15. The method of claim 1, wherein:
    the activation entry is associated with a plurality of values, and
    one of the values is included in the activator entry.

16. A non-transitory computer-readable storage medium containing instructions, that when executed, control a computer system to be operable for:
    displaying a user interface including an activation entry for the activation entry;
    receiving a first value that is input for the activation entry;
    in response to receiving the first value, determining an activator entry that is linked to the activation entry via linking information, the activator entry including an activator value;
    comparing the first value to the activator value to calculate a visibility status for the activator entry; and
    altering the user interface based on the visibility status of the activator entry.

17. The non-transitory computer-readable storage medium of claim 16, wherein input for the activator entry is required for configuring a connection from a first source to a second source.

18. The non-transitory computer-readable storage medium of claim 17, wherein altering the user interface based on the visibility status of the activator entry comprises:
displaying the activator entry when it is required for configuring the connection from the first source to the second source based on the first value from the activation entry.

19. The non-transitory computer-readable storage medium of claim 18, wherein altering the user interface based on the visibility status of the activator entry comprises:
not displaying the activator entry when it is not required for configuring the connection from the first source to the second source based on the first value from the activation entry.

20. An apparatus comprising:
one or more computer processors; and
a non-transitory computer-readable storage medium comprising instructions, that when executed, control the one or more computer processors to be operable for:
displaying a user interface including an activation entry for the activation entry;
receiving a first value that is input for the activation entry;
in response to receiving the first value, determining an activator entry that is linked to the activation entry via linking information, the activator entry including an activator value;
comparing the first value to the activator value to calculate a visibility status for the activator entry; and
altering the user interface based on the visibility status of the activator entry.

\* \* \* \* \*